July 14, 1936. W. D. COHEA ET AL 2,047,310
DEEP TILLAGE SUBSOILER
Filed March 26, 1935 2 Sheets—Sheet 2
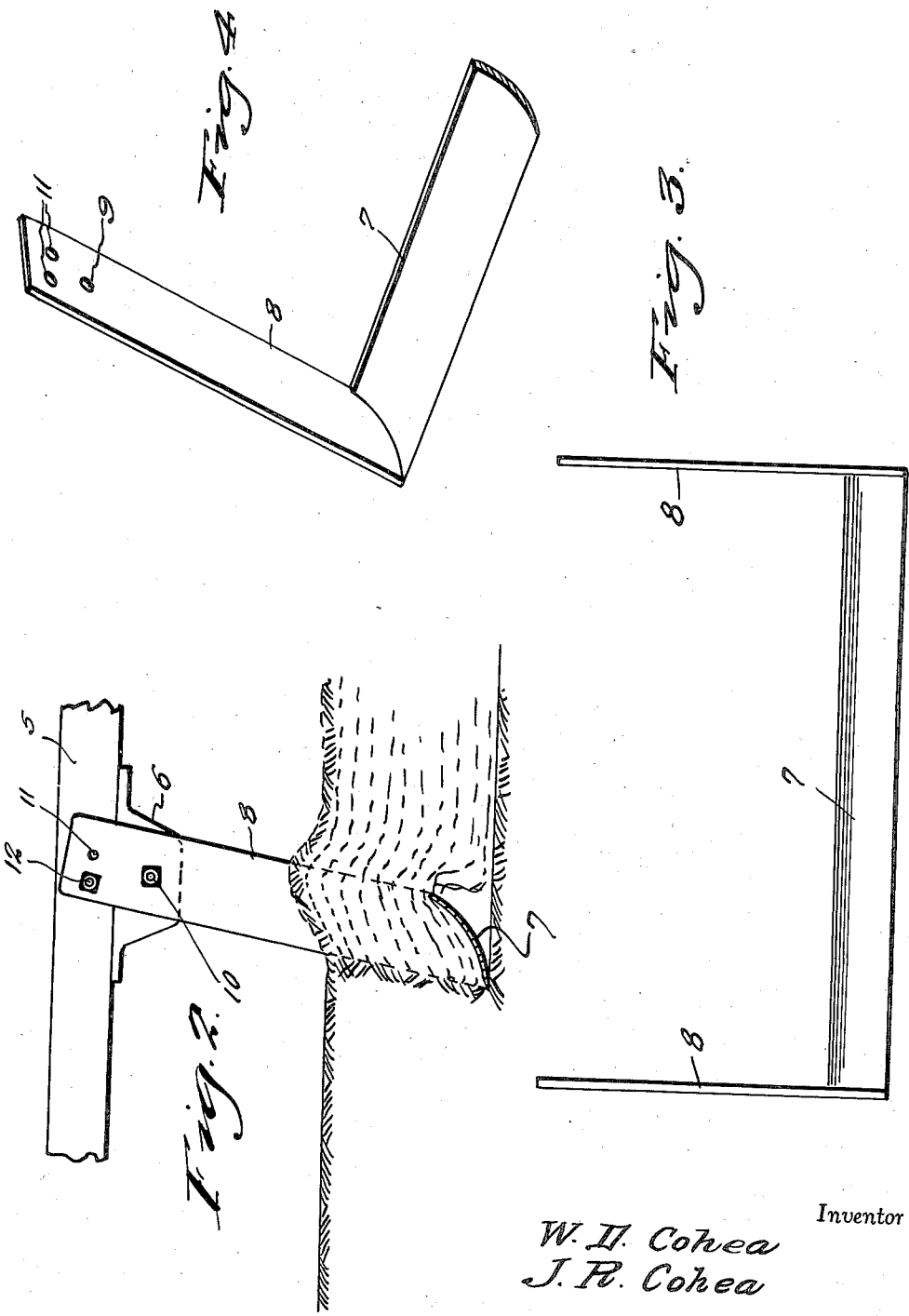

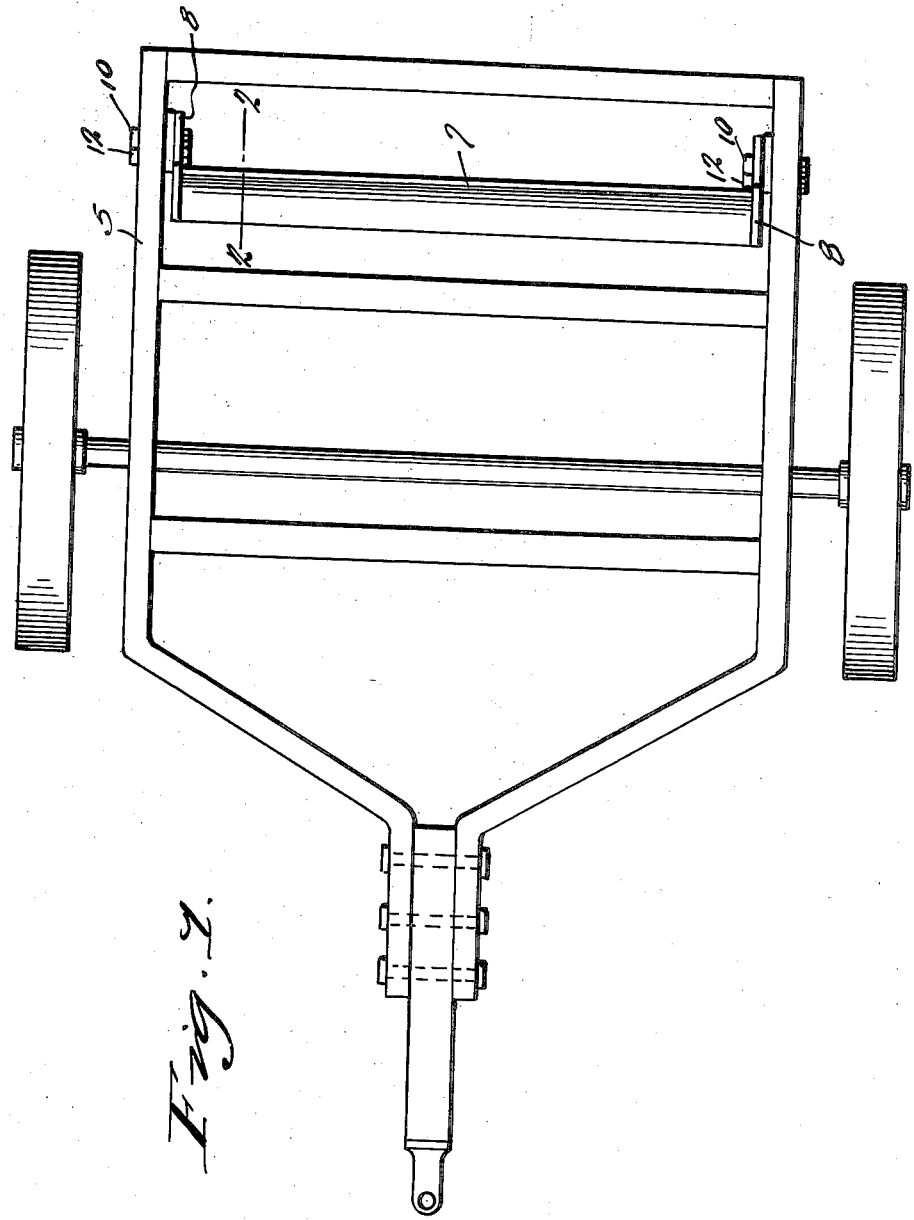

Patented July 14, 1936

2,047,310

UNITED STATES PATENT OFFICE 2,047,310

DEEP TILLAGE SUBSOILER

Wayne Denton Cohea and John Ralph Cohea, Frederick, Okla.

Application March 26, 1935, Serial No. 13,155

1 Claim. (Cl. 97—78)

The present invention relates to a deep tillage subsoiler and has for its prime object to provide means for tillaging the subsoil in a manner somewhat similar to what occurs when a mole goes through the ground.

Another important object of the invention resides in the provision of an agricultural implement of this nature which is comparatively simple in its construction, inexpensive to manufacture, adjustable, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a top plan view of a machine embodying the features of my invention.

Figure 2 is a detail side elevation showing a portion of the frame and the soil working implement in section taken substantially on the line 2—2 of Figure 1.

Figure 3 is a front elevation of said implement.

Figure 4 is a fragmentary perspective view thereof.

Referring to the drawings in detail, it will be seen that the numeral 5 denotes the wheeled frame having blocks or members 6 depending from the side rails thereof preferably adjacent the rear ends of said side rails. Numeral 7 denotes a steel transversely curved blade, having its cutting edge on the front and the back of the blade being higher than the front to raise and loosen the dirt similar to a mole working in the ground. Numerals 8 denote flat side members integrally or otherwise secured to the ends of the blade 7 and rising therefrom and having cutting edges on the forward edges thereof. The upper ends of the side members 8 are provided with openings 9 to receive bolts 10 mounted in the blocks 6 and a plurality of openings 11 to receive bolts 12 mounted in the side rails of the frame 5 so that the side members may be adjusted to change the angular inclination thereof. These side members normally and preferably incline downwardly and forwardly with respect to the frame as shown in Figure 2 and the degree of this angularity may be changed by placing the bolts 12 in the different openings 11.

In Figure 2, I have clearly demonstrated how the subsoiler moves through the ground and the results obtained thereby. It is apparent that the changes in the details of construction, in the combination and arrangement of parts may be resorted to without departing from the spirit and scope of the invention as hereinafter claimed or sacrificing any of the advantages thereof.

Having thus described the invention, what is claimed as new is:

A subsoiler of the character described comprising a wheeled frame including a pair of side members, a depending formation on each of the said side members, a pair of depending members, a pivotal connection between each of the said depending members and a corresponding depending formation on the side member, a transversely extending cutting blade inclined and transversely curved, said blade connecting the lower end of the said depending members, said side members each being provided with an opening, the upper ends of the said depending members being provided with a plurality of openings and securing means for disposition through any one of the plurality of openings for engagement into the opening of the corresponding side members.

WAYNE DENTON COHEA.
JOHN RALPH COHEA.